US004001561B2

United States Statutory Invention Registration [19]

[11] Reg. Number: H1561

Thompson

[45] Published: Jul. 2, 1996

[54] METHOD AND APPARATUS FOR DETECTION OF SEISMIC AND ELECTROMAGNETIC WAVES

[75] Inventor: Artur H. Thompson, Houston, Tex.

[73] Assignee: Exxon Production Research Company, Houston, Tex.

[21] Appl. No.: 310,692

[22] Filed: Sep. 22, 1994

[51] Int. Cl.[6] ..... G01V 3/00; G01V 11/00; G01S 13/00

[52] U.S. Cl. ..... 367/188; 367/14; 181/108; 324/323; 324/334

[58] Field of Search ..... 367/14, 15, 25, 367/36, 37, 178, 182–188, 911, 912; 181/108, 141; 324/323, 334, 347; 250/353

[56] References Cited

U.S. PATENT DOCUMENTS

| | | | |
|---|---|---|---|
| 3,392,327 | 7/1968 | Zimmerman | 324/347 |
| 3,564,914 | 2/1971 | Desai et al. | 367/188 |
| 3,621,380 | 11/1971 | Barlow | 324/323 |
| 3,975,674 | 8/1976 | McEuen | 367/188 |
| 4,009,609 | 3/1977 | Sayer et al. | 324/334 |
| 4,583,095 | 4/1986 | Petersen | 343/5 |
| 4,843,597 | 6/1989 | Gjessing et al. | 367/15 |
| 4,904,942 | 2/1990 | Thompson | 324/323 |
| 4,979,151 | 12/1990 | Ehstram et al. | 367/35 |
| 5,041,792 | 8/1991 | Thompson | 324/350 |
| 5,070,483 | 12/1991 | Berni | 367/14 |
| 5,109,362 | 4/1992 | Berni | 367/14 |

OTHER PUBLICATIONS

Taylor, R. W.; Eos Trans. Americ. Geophys. Union, vol. 64, #18, p. 226, May 30, 1983; Abst. Only Included Herewith.

Van Overmeeren, R. A.; Geophysics, vol. 46/9; 1981, pp. 1304–1313; Abst. Only Herewith.

Thompson et al, 61st Annu. (Geo) SEG Int. Mtg., Nov. 10, 1991, vol. 1, pp. 425–427, (1991): Abst. Only Herewith.

Kepic et al, 62nd Annu. SEG Int. Mtg, Oct. 25, 1992, pp. 446–449, Paper No. EM2–7; Abst. Only Herewith.

Asch et al, NSF Report, Jan. 27, 1988.

*Primary Examiner*—Nelson Moskowitz
*Attorney, Agent, or Firm*—Keith A. Bell

[57] ABSTRACT

A method and apparatus are disclosed for detecting seismic waves and electromagnetic waves at the same location in making geophysical measurements. A seismic wave is generated at a first location and the seismic wave and electromagnetic waves generated by said seismic wave are detected at a spaced-apart second location. The seismic wave may be detected by a single apparatus that also detects the magnetic field. Alternatively, the seismic wave may be detected by two spaced-apart apparatus that also measures the magnetic field at the two spaced-apart locations as well as measuring the electric field between the two apparatus.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR DETECTION OF SEISMIC AND ELECTROMAGNETIC WAVES

BACKGROUND OF THE INVENTION

1. Field of the Invention

This invention pertains to a method and apparatus for detection of seismic and electromagnetic waves in making geophysical measurements.

2. Description of the Prior Art

It is known to use seismic and electromagnetic techniques in making geophysical measurements. Most seismic prospecting is accomplished by the generation of acoustic waves from one or more seismic sources located at or near the earth's surface. These acoustic waves are known to be reflected by interfaces or discontinuities in the subterranean formations so as to be returned to the earth's surface to be detected by one or more appropriately positioned seismic or acoustic detectors, typically geophones. Geophones are devices that detect the mechanical disturbance associated with a seismic wave. A typical geophone consists of a sensing element enclosed in an electrically insulating container. The sensing element may be of any type typically used for seismic exploration. The geophone enclosure is attached to a means for anchoring the geophone to the surface of the earth. The anchoring means may be a plate, typically constructed of metal, or, more often, a stake that may be driven into the ground. Alternatively, geophones or hydrophones may be used down a fluid-filled borehole. Hydrophones may be used offshore.

It is known that some of the reflected seismic waves are called shear waves (s-waves) and other of the reflected seismic waves are called compressional waves (p-waves). Shear waves and compressional waves differ from each other in their respective propagation speed, their angles of reflection and the acoustical vibrational directions of the particles in the layered formations through which the waves pass. The frequency range for relatively deep prospecting is low (e.g., less than about 300 Hz.) because it is well known that the higher frequencies are greatly attenuated by the formation media.

Another scheme that has been employed in petroleum exploration, using different phenomena from the detection of acoustic waves with geophones just described, is electroseismic prospecting or ESP. This technique is described in U.S. Pat. No. 4,904,942, A. H. Thompson, issued Feb. 27, 1990. The physical process required for ESP is the conversion of seismic energy to electromagnetic energy of significant value. The theory behind this technique is that there is a molecular chemical-bond attraction between the fluid and the pore surface of the solid formation, which bond is distorted or broken with the rapid movement of the fluid upon contact by an acoustical wave front, thereby inducing in a dipole manner an electromagnetic response. In applying ESP, a seismic wave is generated by conventional means. The seismic wave travels into the subsurface where it interacts with porous rock containing brine or hydrocarbons. The seismic pressure gradient causes relative motion between the rock grains and the pore fluids. This relative motion distorts dipole layers on the grain surfaces resulting in an electric field that travels back to the surface of the earth where it is detected with electric field antennas. In this context an antenna is composed of two or more electrodes imbedded in the surface of the earth.

There is an essential distinction between ESP data and seismic data. Seismic data only reveal structural information related to the elastic contrast between two different lithological regions. No information is revealed about what kind of rock is present or what fluids occupy the pore space of the regions under investigation. On the other hand, ESP only works where there is mobile, conducting water in the pore space of the formation under investigation or where there is a mixture of water and hydrocarbon. ESP, therefore, yields more information about rock and fluid types.

Another technique that has been employed with respect to the detection of certain mineral deposits utilizes a seismic source that induces a voltage in the deposit due to the piezoelectric effect. In such a case, the seismic wave distorts a piezoelectric formation, like quartz, which then is polarized and emits an electromagnetic wave. No fluids are involved. Such techniques utilize relatively high frequencies and, therefore, are limited to short penetration depths.

It is known to utilize seismic and electromagnetic waves in exploration methods, however, seismic and electromagnetic measurements for gathering geophysical data are treated as two independent tests. Separate systems are designed to optimize the detection sensitivity of each measurement. As already discussed, seismic detectors are commonly geophones used on the earth's surface or down a borehole. Electromagnetic detectors typically comprise two or more metal rods driven into the earth's surface when frequencies above one (1) Hz are to be measured. To measure lower frequencies, various types of electrochemical electrode systems are often used. These include copper sulfate "pot" electrodes. Sheets of metal such as lead may also be used to measure frequencies below one (1) Hz. These sheets are typically one (1) to one hundred (100) square feet in area, are buried one (1) to ten (10) feet in the ground and are moistened with a saline solution.

Current technology treats the seismic and electromagnetic systems as completely independent systems. This is logical because the two measurements are used for different purposes and the seismic and electromagnetic frequencies are often quite different. In magnetotellurics the electromagnetic frequencies measured are typically below one (1) Hz. In seismic tests in the petroleum industry, the frequencies range from ten (10) to several hundred Hz. The seismic measurements are used for higher resolution work while the electromagnetic studies are often of much poorer resolution and are used in a broad survey mode. Further, the seismic and electromagnetic measurements are usually made at different times. In the prior art, it is perceived that the seismic and electromagnetic systems are also incompatible with each other because it is thought that each creates excess noise in the other.

Therefore, detection of electromagnetic and seismic waves in geophysical measurements has required the deployment of two sets of detectors, one for detecting seismic energy and one for detecting electromagnetic energy. This deployment of two sets of equipment is laborious and redundant. Further, using two different measurement systems does not permit the detection of the seismic and electromagnetic signals at the same location and with the same equipment.

Thus, it is the object of the present invention to provide a method for detection of seismic and electromagnetic waves at the same location to obtain both measurements. It is another object of the invention to provide an apparatus that combines seismic and electromagnetic measurement sensors into one unit or system. The present invention results in greatly simplified applications because the transmission of the detected signals to the amplifiers and recorders can be accomplished with the same equipment for both the seismic and electromagnetic signals. The present invention thereby overcomes the limitations of the prior art and provides an improved method and apparatus that enables the detection of electromagnetic fields and seismic waves at the same location.

SUMMARY OF THE INVENTION

The method of the present invention involves making geophysical measurements by generating a seismic wave at a first location and detecting the seismic wave as well as electromagnetic waves generated by the seismic wave at a spaced-apart second location. The seismic wave may be detected by an apparatus that concurrently detects the magnetic field at the second location. Furthermore, the seismic wave may be detected at the second location by two spaced-apart seismic detectors while concurrently detecting the electric field between the two spaced-apart seismic detectors and in addition detecting the magnetic field at the location of each spaced-apart seismic detector.

In one embodiment, the apparatus described herein for detecting seismic waves and the magnetic field in the earth at a single location comprises a housing; a sensing element mounted in the housing and adapted to detect seismic waves in the earth and to emit a signal related to the amplitude of the seismic waves; a first amplifier means for amplifying the signal related to the amplitude of the seismic waves; anchor means for coupling the housing to the earth; an active element mounted in the anchor means adapted to detect magnetic fields in the earth and to emit a signal related to the amplitude of the magnetic field; a second amplifier means for amplifying the signal related to the amplitude of the magnetic field; and electrical wires connecting the sensing element and the active element to the first and second amplifier means, respectively.

In another embodiment, an apparatus described herein detects both electromagnetic and seismic waves in the earth and is comprised of: 1) two seismic detectors, each having a housing, a sensing element mounted in the housing and adapted to detect seismic waves in the earth and to emit a signal related to the amplitude of said seismic waves, amplifier means for amplifying said signal, and anchor means for coupling the housing to the earth; 2) an electric amplifier; and 3) electrical wires connecting each of the two anchor means to the electrical amplifier such that the anchor means acts as electrodes in a geophysical antenna system for detecting electromagnetic waves in the earth. An active element adapted to detect magnetic fields in the earth and to emit a signal related to the amplitude of the magnetic field may also be mounted in the anchor means of the seismic detectors.

BRIEF DESCRIPTION OF THE DRAWINGS

For a better understanding of the present invention, reference may be had to the drawings in which.

These drawings are not intended to in any way define or limit the scope of the present invention, but are provided solely for the purpose of illustrating certain preferred embodiments and applications of the present invention.

DETAILED DESCRIPTION OF THE PREFERRED EMBODIMENTS

Figure 1:
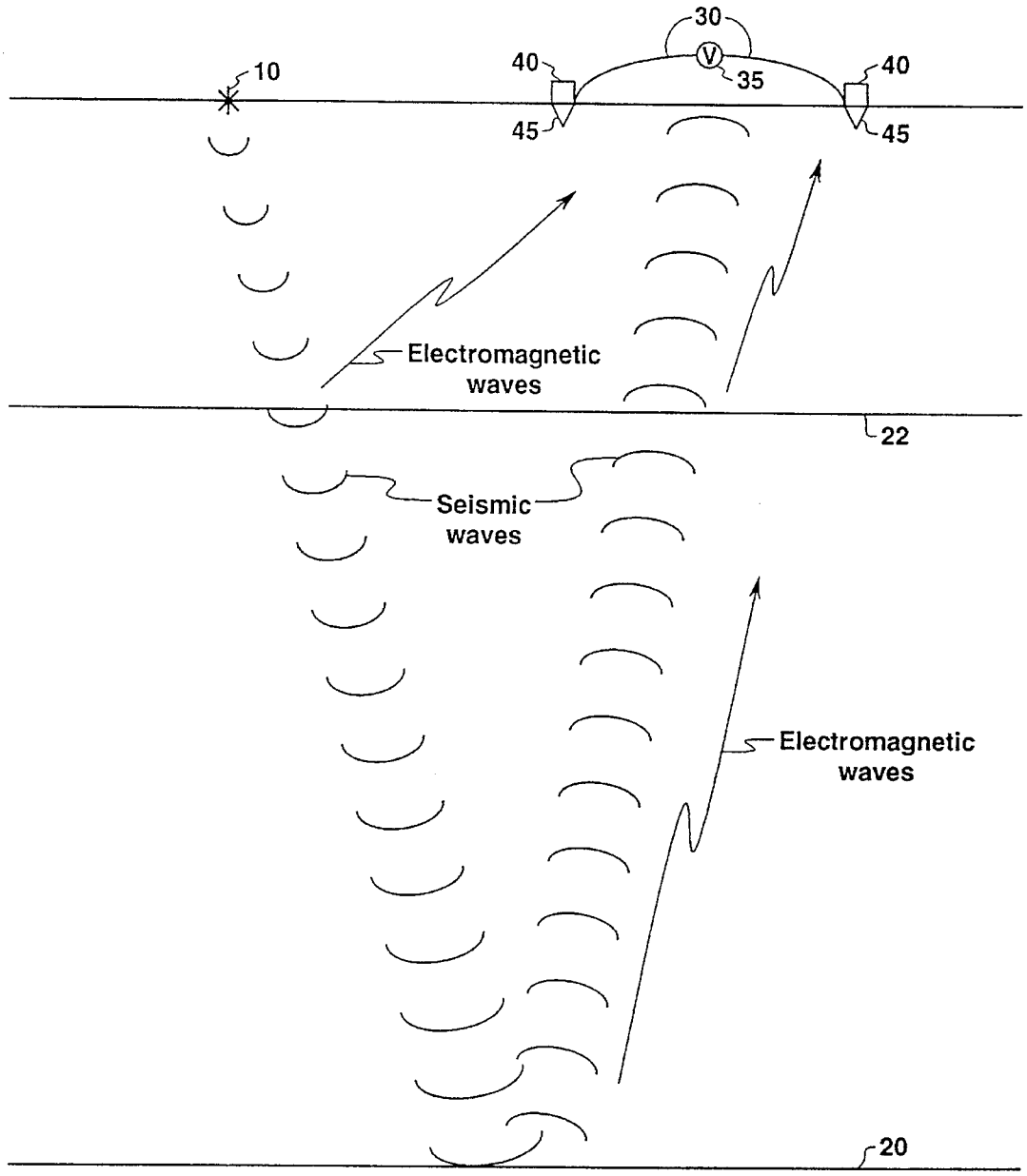
FIG. 1 illustrates combined use of seismic detectors, magnetic sensors and electromagnetic antenna to detect and measure geophysical data.

Referring to FIG. 1, a preferred method of combining seismic sensors, magnetic sensors and electric field antenna to detect and measure geophysical data is shown. A source 10 is used to generate acoustic or seismic waves into the earth. The source may be placed either at or below the surface. When the seismic wave impacts a formation, referred to as reflector 20, seismic waves, both p-wave acoustic energy (compressional waves) and s-wave elastic energy (shear waves), are reflected back to the surface and electromagnetic waves, generated at reflector 20, propagate back to the surface.

Electromagnetic waves are generated due to the "streaming potential" theory discussed in U.S. Pat. No. 4,904,942. According to the "streaming potential" theory, when the seismic waves impact reflector 20, a pressure gradient is established at the respective depth that pushes downward on the fluid in the formation in a substantially vertical direction, thereby breaking molecular bonds between the fluid and the porous surface of the solid formation surrounding the fluid. This effectively establishes a substantially vertical dipole throughout the depth of the formation and produces a vertical electric field in an upward vertical direction at the point of impact of the seismic wave against the reflector. The electric field produces a corresponding electromagnetic wave that emanates away from the impact region. The seismic wave that is reflected back from reflector 20 is also generally converted into electromagnetic energy near the surface of the earth. This conversion is also caused by the "streaming potential" effect. The reflected seismic waves impact fluid in water table 22 also causing generation of electromagnetic waves, as shown. Electromagnetic waves are detected by wires 30 as an induced voltage.

The reflected seismic waves are detected by spaced-apart seismic detectors 40. These seismic detectors are commonly geophones. Seismic detectors 40 are anchored into the ground by means suitable for making adequate contact with the ground. Contact with the ground is often accomplished with a metal rod that is driven into the ground. Anchor means 45 act as electrodes when connected by wires 30 to amplifier 35, thereby making up the electric field detecting antenna system that detects and measures electric fields concurrently with detection of seismic waves by detectors 40. Because electromagnetic waves travel at the speed of light and will arrive at the detection location before the seismic waves, the seismic and electromagnetic waves will be made at the same time, but they may not directly correlate. Anchor means 45 also act as magnetic field sensors when they are equipped with appropriate detectors, such as coils of wire.

Figure 2:
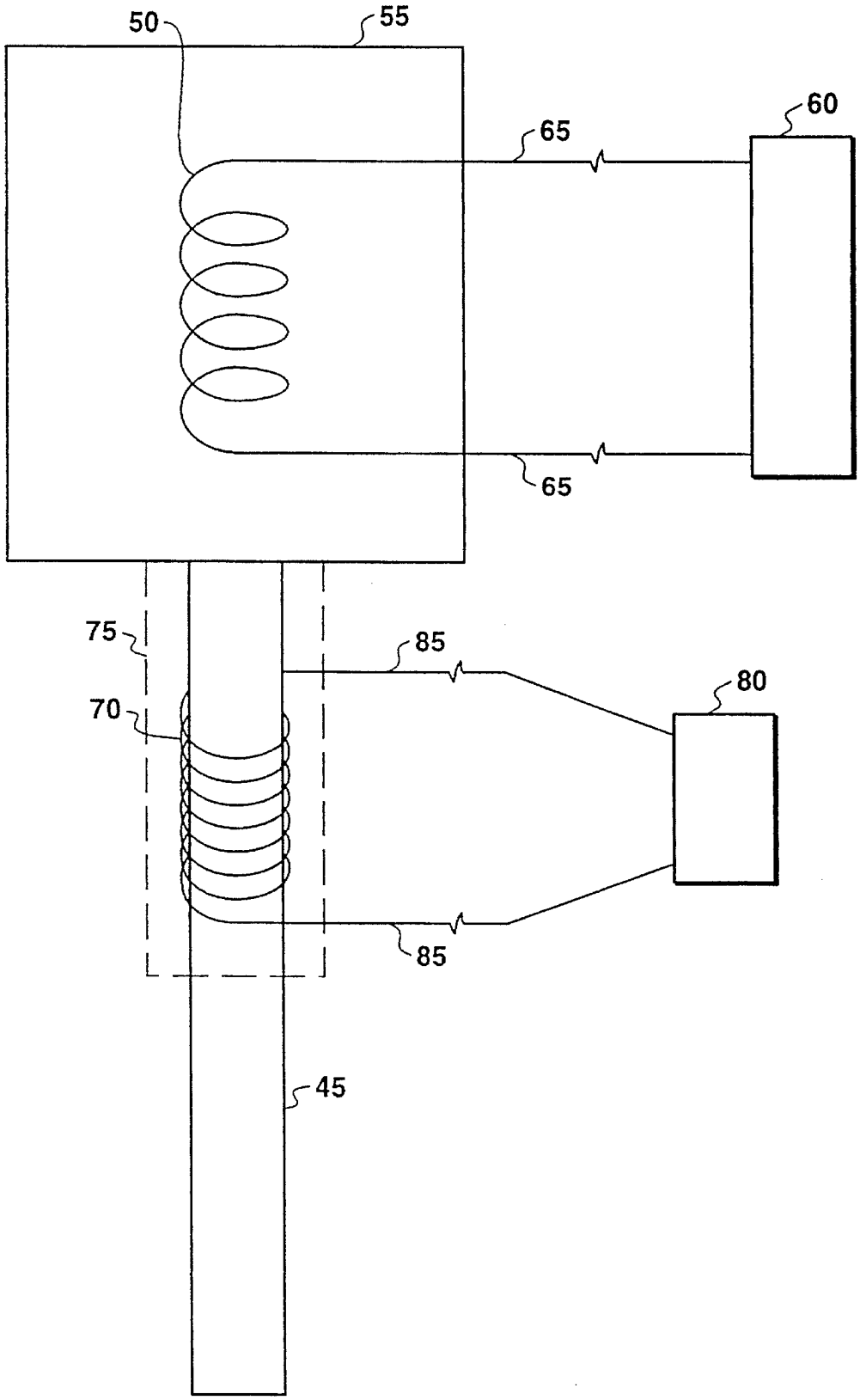
FIG. 2 is a cross-sectional representation of an apparatus that detects seismic waves and magnetic fields in the earth at a single location.

According to one embodiment of the invention, an apparatus is provided for concurrently detecting seismic waves and magnetic fields in the earth at a single location. This embodiment is illustrated in FIG. 2. Referring to FIG. 2, a sensing element 50 is mounted in housing 55 suitable to protect sensing element 50 from the environment. Sensing element 50, typically comprising a coil of wire in the magnetic field of a permanent magnet, is adapted to detect seismic waves in the earth and to emit a signal related to the amplitude of the seismic wave. Sensing element 50 is connected by wires 65 to amplifier 60 for amplifying the signal related to the amplitude of the seismic wave. Amplifier 60 may be any amplifier as well known to those familiar with the state of the art. Anchor means 45, typically a metal rod, couples housing 55 to the earth. An active element 70 may be mounted on or in anchor means 45 and adapted to detect magnetic fields in the earth. Active element 70 may comprise a magnetic field sensing coil to detect the magnetic component of the electromagnetic field. Such a coil can be constructed to detect any or all components of the electromagnetic field. Active element 70 may also comprise a superconducting magnetometer, or any other means known in the art for detecting magnetic fields. Active element 70 may be encased in a housing 75, such as plastic pipe, or in a coating, such as epoxy or any electrically insulating non-magnetic material, for protection from the environment. Active element 70 emits a signal related to the amplitude of the magnetic field and is connected by wires 85 to amplifier means 80 for amplifying this signal. Amplifier 80 may be any amplifier as well known to those familiar with the state of the art.

Figure 3:
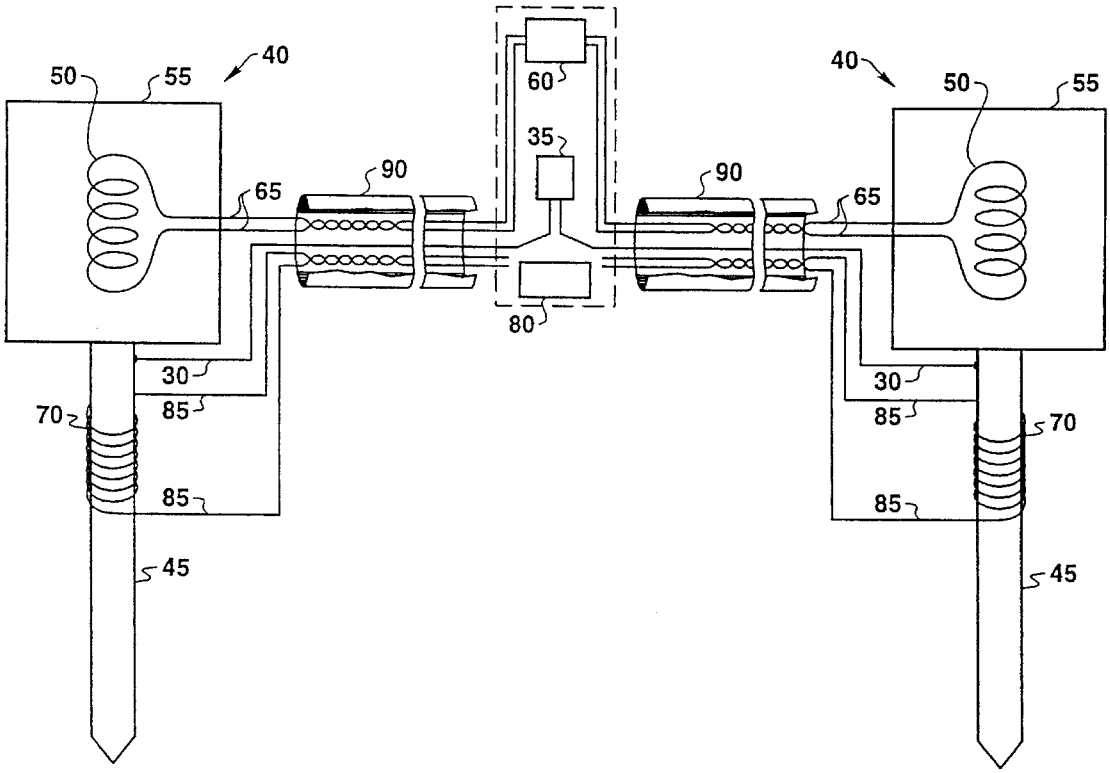
FIG. 3 is a cross-sectional representation of a seismic detection apparatus which also acts as an electromagnetic field detector.

In another embodiment of the invention, shown in FIG. 3, an apparatus for detecting electromagnetic and seismic waves in the earth is provided comprising two spaced-apart seismic detectors 40, each having a housing 55 and a sensing element 50 mounted in housing 55 wherein said sensing elements 50 are adapted to detect seismic waves in the earth and emit a signal related to the amplitude of the seismic waves. Sensing elements 50 are connected by wires 65 to amplifier 60 for amplifying the signals related to the amplitude of the seismic waves. Amplifier 60 may be any amplifier as well known to those familiar with the state of the art. Anchor means 45, typically metal rods, couple housings 55 to the earth. When anchor means 45 are driven into the ground, they act as the electrodes in a geophysical antenna system. Electrical wires 30 connect each of the two anchor means 45 to the input of a suitable amplifier system 35. Wire 30 is connected by any suitable means to ensure good electrical contact between wire 30 and anchor means 45. Suitable amplifiers include conventional geophone amplifiers and special purpose amplifiers designed to amplify the voltage developed between two electrodes. Those skilled in the art will recognize that this system will respond to the seismic signals at each seismic detector and to the electromagnetic field generated between the detectors. An active element 70 may be mounted in anchor means 45 and adapted to detect magnetic fields in the earth.

Anchor means 45 may comprise an electrochemically active electrode system as well known in the art such as a copper sulfate pot electrode. This electrode can be constructed of robust materials such as stainless steel that will also supply structural support for the geophone element and provide efficient coupling of seismic energy to the geophone. Alternatively, a sheet of metal designed to reduce the electrical resistance at the soil/electrode interface as well known in the art may be attached to anchor means 45. This additional electrode may be buried separately in the soil and attached to anchor means 45 with a connecting wire or may be made an integral part of the rod electrode by coiling it around anchor means 45.

In a further embodiment of the invention, sensing element 50 may comprise a geophone, an accelerometer, or a hydrophone. Special purpose geophones, such as "marsh geophones" may be used in wet environments, multi-axis geophones may be used to record orthogonal components of the seismic wave, or shear wave geophones may be used to record specific components of the seismic wave. A hydrophone would be of use on the sea floor or in other submerged environments.

Any of the above embodiments can be reconfigured for use in the downhole environment. Such devices will be particularly useful in an uncased hole or in a hole cased with plastic pipe so that the electromagnetic field sensing is not disrupted by a metal casing.

The present invention described above has certain advantageous features over the prior art. Seismic and electroseismic measurements can be made at the same time using the same seismic source. The combined detector described above also reduces the time required to set up a field survey because less equipment is required. Further, as shown in FIG. 3, the combined detector also simplifies the wiring of the detectors since a single cable 90 can contain the antenna wires 30, the seismic detector wires 65, and the magnetic field detector wires 85. Wires 65 and 85 may each comprise a twisted pair cable to eliminate any potential interference in the wiring configuration. Further, electric field amplifier 35, seismic amplifier 60 and magnetic field amplifier 80 may all be housed in a single location. This simplification of wiring decreases the complexity of the field operation and hence decreases the cost and reduces errors in wiring connections.

The present invention may be used in several different applications. The most ideal applications are in oil exploration, pollution migration and ground water hydrology. In these applications the seismic and electromagnetic signals have essentially the same frequency content and it is advantageous to collect data simultaneously. The present invention is also useful in exploration methods that rely on the conversion of seismic to electromagnetic energy in piezoelectric formations such as quartzose rock. Piezoelectric conversion is suggested in the literature as a means for mineral exploration.

The present invention can also be useful in passive monitoring of the earth's electromagnetic and seismic fields. The present invention will improve data collection by providing complementary data collected at the same time and location and will lower the cost of the test by reducing the number of sensors and the number of wires required since all the wires can be bundled into a single cable. This may be a particular cost advantage in the long base-line tests used in such studies.

The present invention can also be useful in combined seismic and electromagnetic crossborehole tests. Downhole tests may be simplified by combining the seismic and electromagnetic detectors so that only one device needs to be anchored to the wall of the borehole. Tests on the sea floor or in lake environments may be simplified with combined detector, especially for electroseismic studies.

While the preferred embodiments of the invention have been shown and described, and some modifications or alternatives have been discussed, it will be understood that the invention is not limited thereto because modifications can be made and will become apparent to those skilled in the art.

What is claimed is:

1. A method of making geophysical measurements comprising:

(a) generating a seismic wave at a first location; and (b) concurrently detecting with an apparatus both the seismic wave and electromagnetic waves generated by said seismic wave at a spaced-apart second location.

2. The method of claim 1 wherein said seismic wave and a magnetic field are concurrently detected at said second location.

3. The method of claim 1 wherein said seismic wave is detected by two spaced-apart seismic detectors at said second location.

4. The method of claim 3 wherein an electric field is concurrently detected between said spaced-apart seismic detectors.

5. The method of claim 3 wherein a magnetic field is concurrently detected at the location of each spaced-apart seismic detector.

* * * * *